US009157424B2

(12) United States Patent
Smith et al.

(10) Patent No.: US 9,157,424 B2
(45) Date of Patent: Oct. 13, 2015

(54) MOTOR FOR COMPRESSOR PUMPS AND RELATED COMPRESSOR ASSEMBLY

(71) Applicant: MAT INDUSTRIES, LLC, Long Grove, IL (US)

(72) Inventors: Steven Bradley Smith, Milan, TN (US); Robert Louis Hite, Jackson, TN (US); Jerry David Phillips, Milan, TN (US)

(73) Assignee: MAT Industries, LLC, Long Grove, IL (US)

( * ) Notice: Subject to any disclaimer, the term of this patent is extended or adjusted under 35 U.S.C. 154(b) by 199 days.

(21) Appl. No.: 13/957,532

(22) Filed: Aug. 2, 2013

(65) Prior Publication Data

US 2014/0037476 A1    Feb. 6, 2014

Related U.S. Application Data

(60) Provisional application No. 61/679,452, filed on Aug. 3, 2012.

(51) Int. Cl.
| H02K 1/06 | (2006.01) |
| F04B 17/03 | (2006.01) |
| H02K 1/12 | (2006.01) |
| H02K 1/22 | (2006.01) |
| H02K 23/40 | (2006.01) |
| H02K 1/14 | (2006.01) |
| H02K 1/26 | (2006.01) |
| H02K 7/02 | (2006.01) |
| H02K 7/10 | (2006.01) |

(52) U.S. Cl.
CPC *F04B 17/03* (2013.01); *H02K 1/12* (2013.01); *H02K 1/146* (2013.01); *H02K 1/22* (2013.01); *H02K 1/26* (2013.01); *H02K 23/40* (2013.01); *H02K 7/02* (2013.01); *H02K 7/1004* (2013.01); *H02K 2213/03* (2013.01)

(58) Field of Classification Search
USPC .............. 310/216.097, 216.111, 216.107, 89, 310/254.1, 261.1, 269
See application file for complete search history.

(56) References Cited

U.S. PATENT DOCUMENTS

| 3,643,118 | A | * | 2/1972 | Ichiki et al. ................. 310/40 R |
| 5,045,742 | A | * | 9/1991 | Armstrong et al. .... 310/216.069 |
| 5,955,814 | A | * | 9/1999 | Fujiwara ................ 310/216.087 |
| 6,762,531 | B2 | * | 7/2004 | Gilliland et al. ........... 310/254.1 |
| 7,081,698 | B1 | | 7/2006 | Burkholder |
| 8,084,900 | B2 | * | 12/2011 | Schoen et al. .................. 310/50 |
| 8,154,167 | B2 | * | 4/2012 | Tang ...................... 310/216.069 |
| 8,212,448 | B2 | * | 7/2012 | Sun et al. ...................... 310/158 |
| 2010/0156229 | A1 | * | 6/2010 | Liu et al. ....................... 310/158 |

* cited by examiner

*Primary Examiner* — Thanh Lam
(74) *Attorney, Agent, or Firm* — Greer, Burns & Crain, Ltd.

(57) ABSTRACT

An electric motor is provided, including a stator having two electromagnetic poles diametrically opposite each other, a rotor including a rotor core configured for being rotatably mounted with a shaft for rotation relative to the stator. The rotor core is formed by stacking a plurality of laminations each of which has a central hole and a plurality of generally radially extending teeth. The stator and the rotor have geometric attributes such that: R1=G*0.9968, wherein G is defined as thickness of a field yoke, and R1 is defined as a distance from an outside edge of a central hole to bases of the teeth. A compressor assembly is also provided that employs the present motor.

5 Claims, 6 Drawing Sheets

MOTOR FOR COMPRESSOR PUMPS AND RELATED COMPRESSOR ASSEMBLY

RELATED APPLICATION

This application claims priority under 37 CFR 119(e) from U.S. application Ser. No. 61/679,452 filed Aug. 3, 2012.

BACKGROUND

The present invention is directed to electric motors, and more specifically to a motor having improved operational efficiency, as well as compressor assembly employing that motor.

Electric motors are widely utilized for providing increased functionality in many devices in current use. There are a variety of motor types available to suit electrical drive power needs. AC induction motors and DC motors are the most common, but other motor designs such as synchronous, switched reluctance and permanent magnetic motors are used in various applications.

While several applications are contemplated for the present motor, such as appliances, the present motor is preferably intended for use with compressor and pump assemblies and related equipment. Suitable applications for such motors are described in U.S. Pat. Nos. 2,107,872; 2,560,560; 3,686,524; 5,231,917; 6,005,321; 6,762,531; and 7,081,698, all of which are incorporated by reference.

SUMMARY

An improved electric motor is provided, featuring enhanced design geometry in the laminations. Motors produced with the present geometry were found to achieve greater efficiency compared to conventional models, especially when the motor is coupled to a compressor pump assembly.

More specifically, an electric motor is provided, including a stator having two electromagnetic poles diametrically opposite each other, a rotor including a rotor core configured for being rotatably mounted with a shaft for rotation relative to the stator. The rotor core is formed by stacking a plurality of laminations each of which has a central hole and a plurality of generally radially extending teeth. The stator and the rotor have geometric attributes such that: R1=G*0.9968, wherein G is defined as thickness of a field yoke, and R1 is defined as a distance from an outside edge of a central hole to bases of the teeth.

In another embodiment, an electric motor is provided, including a stator having two electromagnetic poles diametrically opposite each other, a rotor including a rotor core configured for being rotatably mounted with a shaft for rotation relative to the stator. The rotor core is formed by stacking a plurality of laminations each of which has a central hole and a plurality of generally radially extending, generally T-shaped teeth. The stator and the rotor have geometric attributes such that: R1=G*0.9968, wherein G is defined as thickness of a field yoke, and R1 is defined as a distance from an outside edge of a central hole to bases of the teeth.

In yet another embodiment, a compressor system is provided, including the motor as described above, a drive pulley connected to the motor; a pump assembly including a piston reciprocating relative to a cylinder, the piston connected to a flywheel and a drive belt connecting the drive pulley directly to the flywheel. Preferably, the drive belt is a poly v belt. Also, the present compressor system is configured for producing at least 6.8 SCFM at 40 psi.

DETAILED DESCRIPTION

Figure 1:
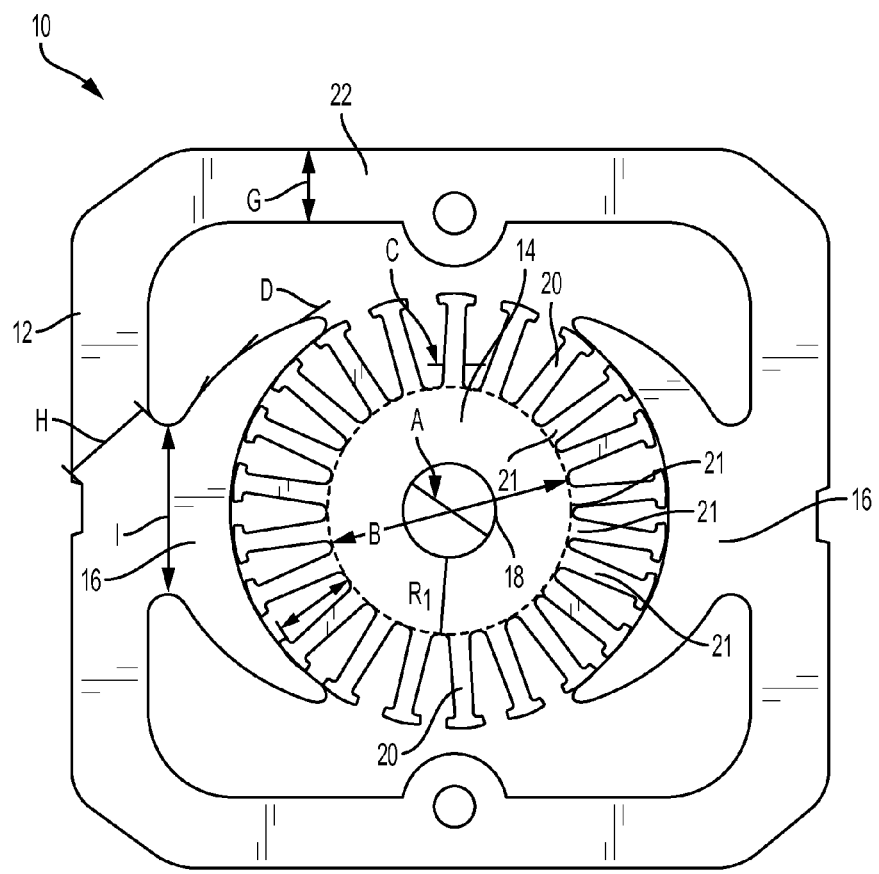
FIG. 1 is a cross-section through the present motor.
Figure 2:
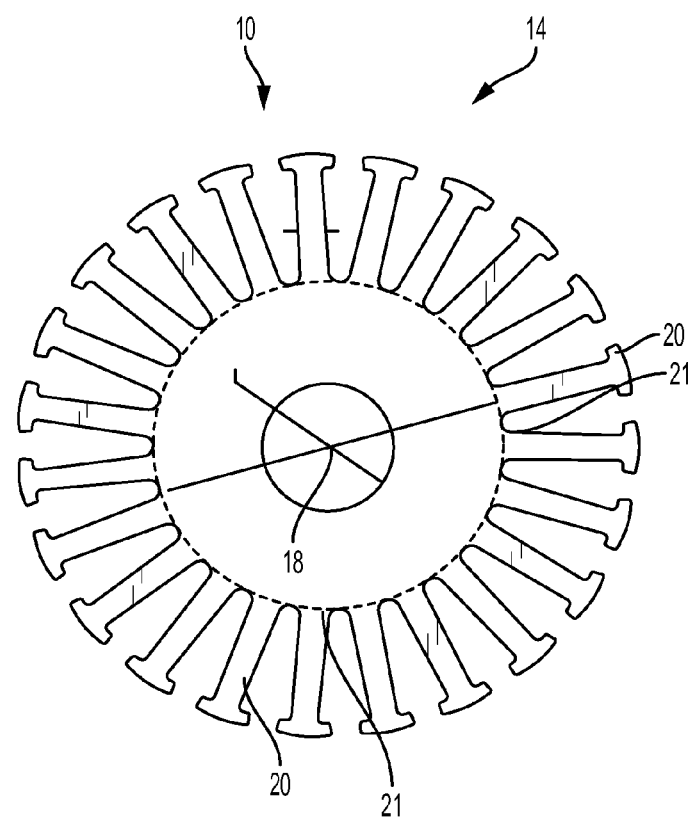
FIG. 2 is a cross-section of the present rotor core.
Figure 3:
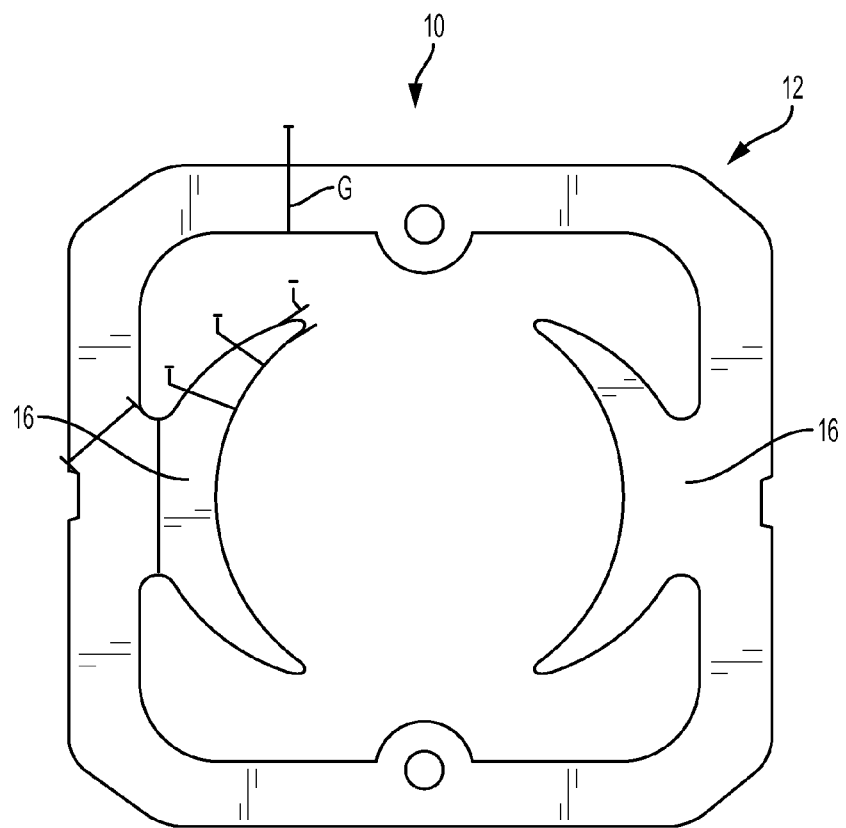
FIG. 3 is a cross-section of the present stator.

Referring now to FIGS. 1-3, a motor is generally designated 10 and includes a stator 12 and a rotor core 14. As is known in the art, wire windings are wound around the core 14, and an armature shaft (FIG. 5) is mounted through the center of the core so that the armature is rotatable relative to the stator 12. In a preferred embodiment, the stator 12 includes two electromagnetic poles 16. As is typical with conventional motors, the rotor core 14 is formed by stacking a plurality of laminations, each of which has a central bore or hole 18 and a plurality of generally T-shaped, generally radially-extending teeth 20. As is also well known in the art, the motor 10 includes a commutator (not shown) mounted on the armature shaft, the commutator receives electric power from brushes (not shown) and is connected to the rotor core 14.

To achieve improved efficiency of the motor 10, the dimensions of the stator 12 and rotor core 14 are configured for generating significant power. These dimensions include a diameter (A) of a central hole 18, dimensioned for accommodating the armature shaft as is known in the art; a diameter (B) of the rotor core 14, excluding teeth 20; the radius ($R_1$) of the rotor core 14, measured from an outside edge of the central hole 18 to bases 21 of the teeth 20 where the teeth meet the core; the thickness per pitch (C) of the teeth 20; (D) is a thickness of tips of the poles 16; a thickness (G) of a field yoke 22 of the motor 10; and (H) is a diagonal thickness of the field yoke; and (I) is defined as a thickness of a bottom part of a dish-shaped electromagnetic pole. Another way of describing the radius (R1) is as a distance from an outside edge of the central hole 18 to an end of a groove which separates the plurality of generally T-shaped teeth.

The thickness (G) of the field yoke 22 of the motor 10 has been found to directly correspond to the efficiency of the motor. In addition, the radius ($R_1$) of the rotor core 14 is related to the thickness (G) of the field yoke 22 of the motor 10. The relationship can be expressed according to the following equation: [$R_1$=G*K], where K is a constant. The radius is obtained as follows: $R_1$=B−A/2.

For the present motor, the constant (K) is preferably equal to 0.9968, making the radius of the rotor core equation: [$R_1$=G*0.9968]. Using this constant value has been found to improve the efficiency of the motor and reduce energy losses.

Figure 4:
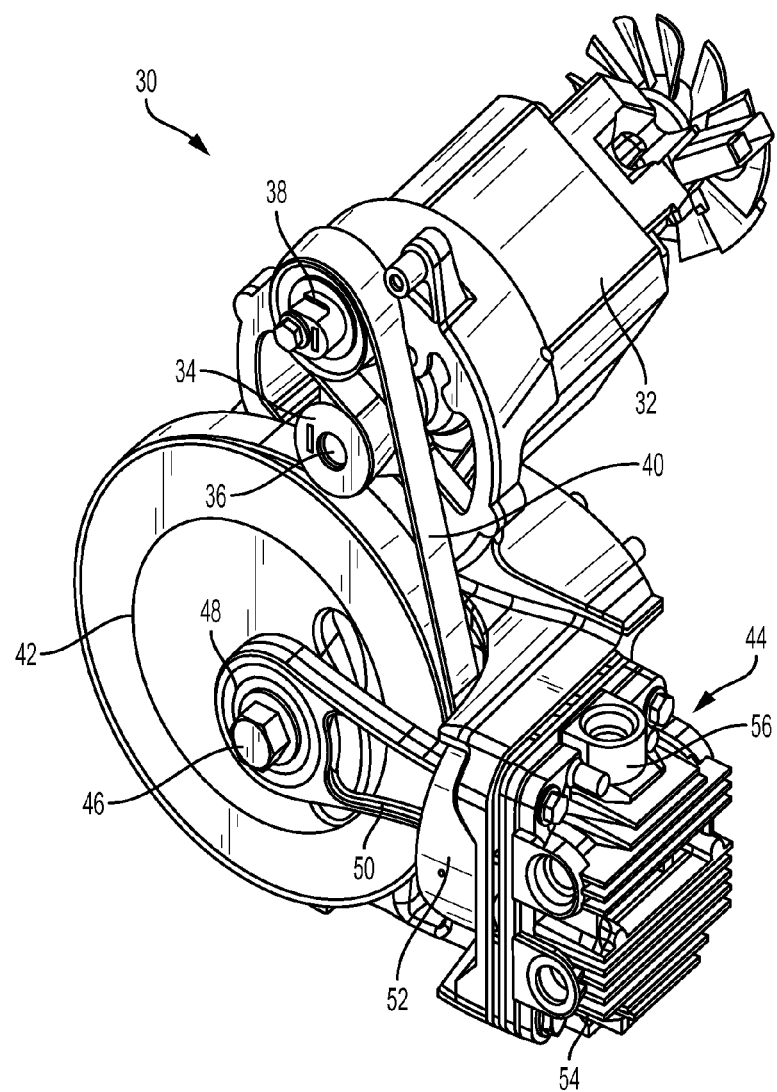
FIG. 4 is a perspective view of a prior art compressor system, employing a prior art motor.

Referring now to FIG. 4, a prior art compressor system is generally designated 30, and includes an electric motor 32 of the type disclosed in U.S. Pat. No. 7,081,698 incorporated by reference. One example of such a motor is sold by Stanley Black & Decker Co. A drive pulley 34 is connected to the armature shaft 36 for common rotation. A freely-rotating idler pulley 38 is adjustable as is known in the art, and is mounted to the motor 32. A serpentine-type drive belt 40 is mounted to the drive pulley 34 and to the idler pulley 38. The drive belt 40 is also engaged on the periphery of a flywheel 42 of a compressor piston assembly or pump 44. On the flywheel 42 is an offset mounting point 46 to which is rotatably mounted a lower end 48 of a connecting rod 50. Opposite the lower end 48, the connecting rod is provided with a piston 52 as is well known in the compressor art. An air cooled cylinder or cylinder head 54 encompasses the piston and defines a space in which the piston reciprocates for generating compressed air. As the motor 32 causes the rotation of the flywheel 42, the piston 52 reciprocates relative to the cylinder 54 for generating compressed air, which is emitted through at least one outlet port 56.

When applied to compressor systems similar to the system 30, it has been found that the prior art motor 32 suffered from power efficiency problems, especially when connected to the compressor piston assembly 44 as depicted in FIG. 4.

Figure 5:
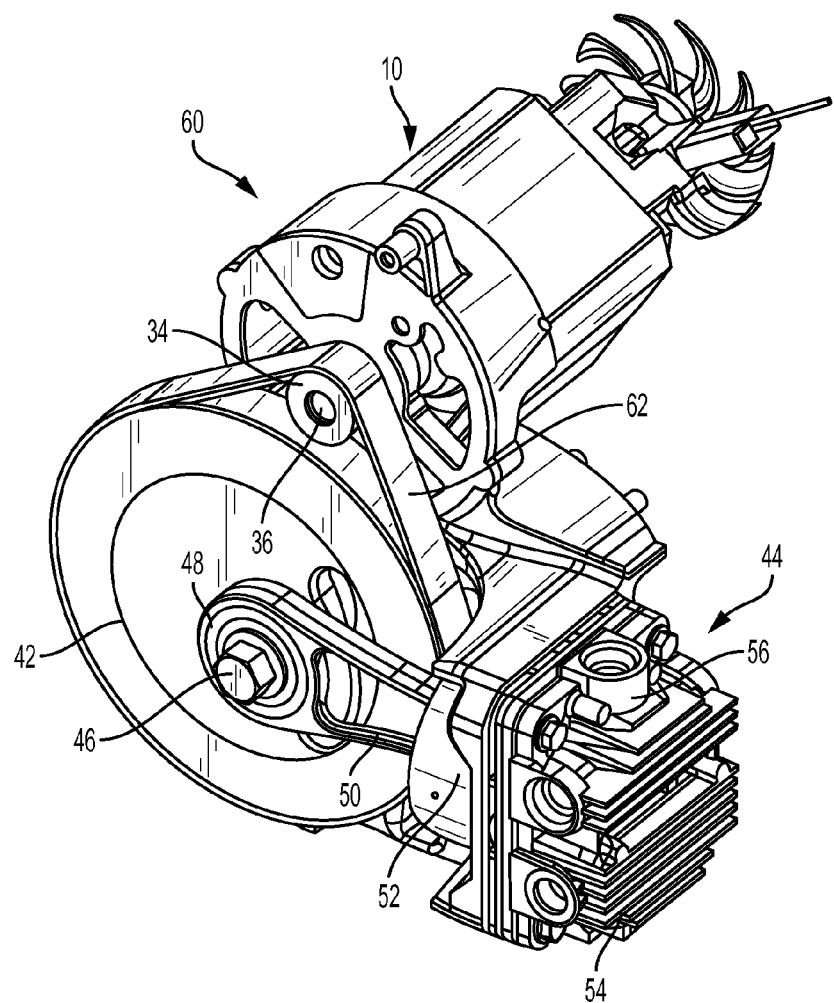
FIG. 5 is perspective view of the present compressor assembly employing the present motor.

Referring now to FIG. 5, the present compressor system is generally designated 60. Components of the system 60 that correspond to the components of the system 30 are designated with identical reference numbers. Two main differences between the systems 30 and 60 are that the latter is equipped with the present motor 10, and the idler pulley 38 has been eliminated. Further, the conventional drive belt 40 has been replaced with an expandable ploy-v serpentine belt 62, known in the art, which does not require an idler pulley for installation. Instead, the belt 62 is temporarily stretched around the drive pulley 34 and the flywheel 42, and through operation, fibers in the belt shrink to provide a tight, power-transmitting grip connection between the motor 10 and the compressor piston assembly 44.

Figure 6:
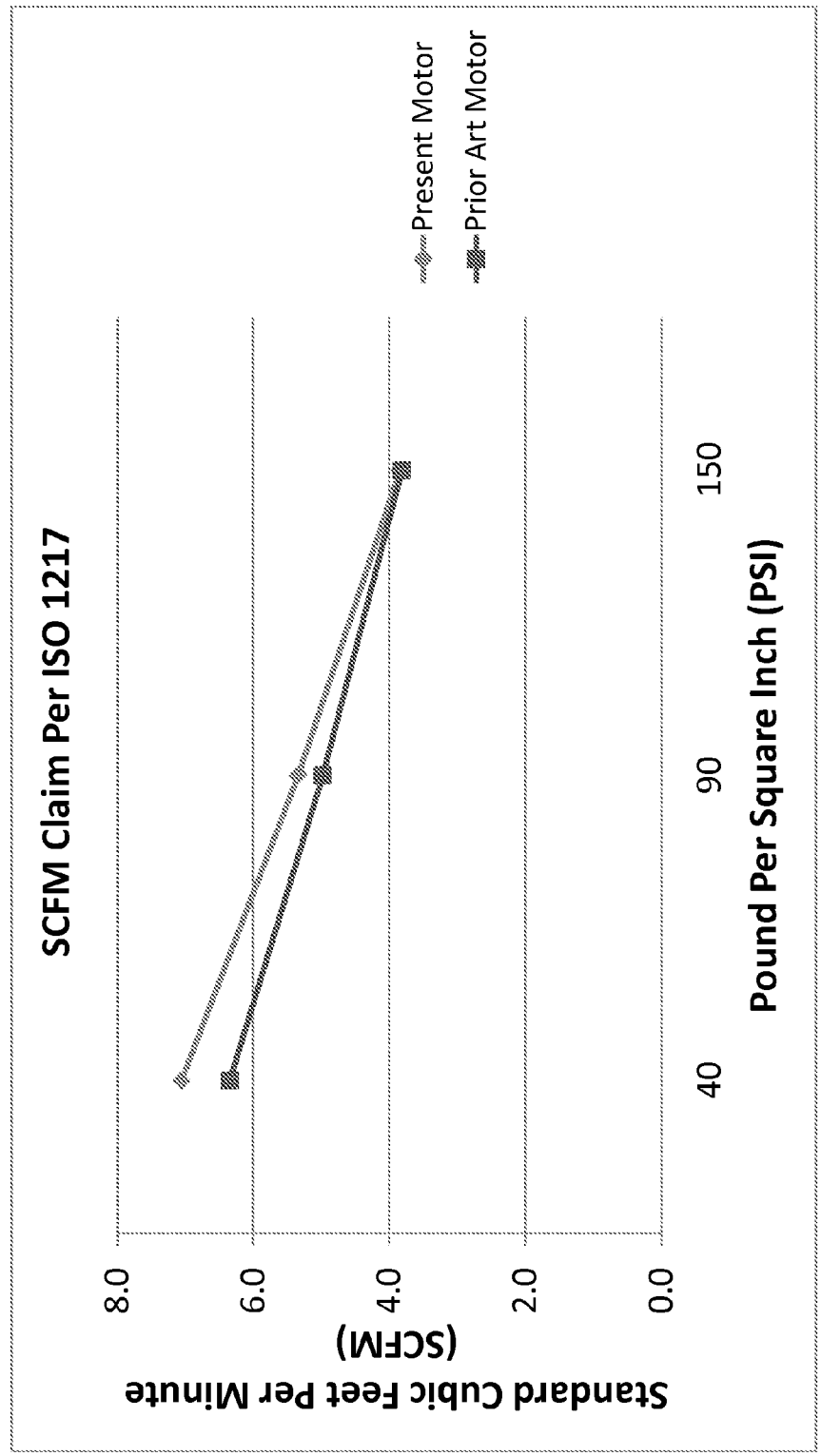
FIG. 6 is a table plotting Standard Cubic Feet Per Minute against Pounds Per Square Inch.

By use of the present motor 10, and by eliminating the idler pulley 38, the present compressor system 60 has achieved improved performance over the prior art system depicted in FIG. 4. Referring now to FIG. 6, using ISO Standard 1217 (applying to compressors and pneumatic tools, machines and equipment), Standard Cubic Feet Per Minute (SCFM) are plotted against Pounds Per Square Inch (PSI). The present compressor system 60 is indicated by the diamond block line, and the prior art system 30 is indicated by the square block line. It will be seen that at lower PSI outputs, in the range of 40 psi, the present system 60 provides a greater output of compressed air. This advantage decreases as the PSI of the compressor increases.

Referring now to Table 1, a numerical comparison is shown of the graph of FIG. 6, and also includes data related to power draw in amperage of six examples of the present motor 10 used in the compressor system 60, against six examples of the prior art system 30 using the motor 32. This evaluation was also performed according to ISO 1217, as described above in relation to FIG. 6. The data show that the present compressor system 60 achieved an 11.2% average increase in air delivery at 40 psi, which decreased as the psi increased. Amperage values, provided to indicate that the applicable UL 1450 Section 13.1.13 is met, also increased in the present system 60 over the prior art system.

The improvements of the present compressor system 60 are more noticeable at the lower pressures due to clearance volume and pump RPM differences between the two systems 60, 30. As the pressure (psi) increases, the pump becomes more sensitive and creates changes to the compressed gases. Clearance volume is slightly higher in the system 60 than the system 30, resulting in a smaller percentage increases at the higher pressures. Clearance volume is the remaining volume between the piston 52 and the cylinder head 54 when the piston is at top dead center and confined within the cylinder walls.

TABLE 1

| Present Motor Per ISO 1217 | | | | | | | | |
| --- | --- | --- | --- | --- | --- | --- | --- | --- |
| Air delivery (SCFM) | | | | | | | AVG | % Increase |
| 40 psi | 6.8 | 7.0 | 7.1 | 7.3 | 7.2 | 6.9 | 7.1 | 11.2 |
| 90 psi | 5.3 | 5.3 | 5.4 | 5.5 | 5.3 | 5.1 | 5.3 | 7.3 |
| 150 psi | 3.7 | 3.9 | 4.0 | 4.0 | 3.9 | 3.6 | 3.8 | 0.0 |
| Amperage | | | | | | | MAX | |
| 40 psi | 12.73 | 12.68 | 13.08 | 13.02 | 12.58 | 12.60 | 13.08 | |
| 90 psi | 14.27 | 14.15 | 14.64 | 14.56 | 14.19 | 14.42 | 14.64 | |
| 150 psi | 14.36 | 14.28 | 14.79 | 14.89 | 14.37 | 14.42 | 14.89 | |
| Prior Art Unit Per ISO 1217 | | | | | | | | |
| Air delivery (SCFM) | | | | | | | AVG | |
| 40 psi | 6.3 | 6.3 | 6.6 | 6.3 | 6.3 | 6.3 | 6.3 | |
| 90 psi | 4.9 | 4.9 | 5.1 | 5.0 | 5.0 | 5.0 | 5.0 | |
| 150 psi | 3.6 | 3.7 | 3.9 | 3.8 | 3.9 | 4.0 | 3.8 | |
| Amperage | | | | | | | MAX | |
| 40 psi | 12.20 | 12.40 | 11.90 | 12.50 | 12.40 | 12.70 | 12.70 | |
| 90 psi | 13.50 | 13.70 | 13.80 | 13.80 | 13.60 | 13.09 | 13.90 | |
| 150 psi | 13.90 | 14.10 | 14.40 | 14.70 | 14.10 | 14.50 | 14.70 | |

Thus, the present motor 10, when installed in the compressor system 60, has been found to significantly increase compressor output compared to conventional compressor systems.

While a particular embodiment of the present motor for compressor pumps and related compressor assembly has been described herein, it will be appreciated by those skilled in the art that changes and modifications may be made thereto without departing from the invention in its broader aspects and as set forth in the following claims.

The invention claimed is:

1. An electric motor, comprising:
   a stator having two electromagnetic poles diametrically opposite each other;
   a rotor including a rotor core configured for being rotatably mounted with a shaft for rotation relative to said stator, said rotor core being formed by stacking a plurality of laminations each of which has a central hole and a plurality of generally radially extending teeth; and said stator and said rotor have geometric attributes such that: $R1=G*0.9968$, wherein G is defined as thickness of a field yoke, and R1 is defined as a distance from an outside edge of said central hole to bases of said teeth.

2. An electric motor, comprising:
   a stator having two electromagnetic poles diametrically opposite each other;
   a rotor including a rotor core configured for being rotatably mounted with a shaft for rotation relative to said stator, said rotor core being formed by stacking a plurality of laminations each of which has a central hole and a plurality of generally T-shaped teeth;
   said plurality of generally T-shaped, radially extending teeth form salient poles of said rotor core; and
   said stator and said rotor have geometric attributes such that: $R1=G*0.9968$, wherein G is defined as thickness of a field yoke, and R1 is defined as a distance from an outside edge of said central hole to bases of said teeth.

3. A compressor system, comprising:
   a motor as defined in claim 1;
   a drive pulley connected to said motor;
   a pump assembly including a piston reciprocating relative to a cylinder, said piston connected to a flywheel; and
   a drive belt connecting said drive pulley directly to said flywheel.

4. The compressor system of claim 3 wherein said drive belt is a poly v belt.

5. The compressor system of claim 3 being configured for producing at least 6.8 SCFM at 40 psi.

* * * * *